United States Patent
Jain et al.

(10) Patent No.: US 12,282,784 B1
(45) Date of Patent: Apr. 22, 2025

(54) MEDIA DEVICE USER INTERFACE AND CONTENT PERSONALIZATION USING NATURAL LANGUAGE PROMPTS

(71) Applicant: ROKU, INC., San Jose, CA (US)

(72) Inventors: Atishay Jain, San Bruno, CA (US); Fei Xiao, San Jose, CA (US); Abhishek Bambha, Burlingame, CA (US); Mehul Agrawal, Sunnyvale, CA (US); Rohit Mahto, San Jose, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/486,515

(22) Filed: Oct. 13, 2023

(51) Int. Cl.
*G06F 3/048* (2013.01)
*G06F 9/451* (2018.01)
*G06F 40/30* (2020.01)
*G10L 15/26* (2006.01)

(52) U.S. Cl.
CPC .............. *G06F 9/451* (2018.02); *G06F 40/30* (2020.01); *G10L 15/26* (2013.01)

(58) Field of Classification Search
None
See application file for complete search history.

(56) References Cited

U.S. PATENT DOCUMENTS

| | | | |
|---|---|---|---|
| 11,495,219 B1* | 11/2022 | Srivatsa | G10L 15/22 |
| 12,106,126 B2* | 10/2024 | Geller | G06N 5/022 |
| 2022/0188157 A1* | 6/2022 | Sharma | G06F 11/302 |
| 2023/0094522 A1* | 3/2023 | Stauber | G06T 15/506 |
| | | | 715/719 |
| 2023/0409615 A1* | 12/2023 | Khemka | G06V 20/68 |
| 2024/0038227 A1* | 2/2024 | Shaikh | G10L 15/22 |
| 2024/0119932 A1* | 4/2024 | Khorshid | G06Q 50/01 |

* cited by examiner

*Primary Examiner* — Thanh T Vu
(74) *Attorney, Agent, or Firm* — Sterne, Kessler, Goldstein & Fox P.L.L.C.

(57) ABSTRACT

Disclosed herein are system, method and/or computer program product embodiments, and/or combinations and subcombinations thereof, for personalizing a user interface (UI) of a media device and/or content presented thereby. An example embodiment operates by obtaining a first natural language user input, providing the first natural language user input to a personalization language model that is configured to interpret different natural language user inputs to respectively determine different update tasks invoked thereby, the different update tasks including a UI update task and a content update task, receiving from the model a first update task determined thereby based at least on the first natural language user input, generating one or more first application programming interface (API) calls based on the first update task, and placing the one or more first API calls to a service that implements the first update task based on the one or more first API calls.

20 Claims, 9 Drawing Sheets

MEDIA DEVICE USER INTERFACE AND CONTENT PERSONALIZATION USING NATURAL LANGUAGE PROMPTS

BACKGROUND

Field

This disclosure is generally directed to a system that enables a user to personalize a user interface (UI) of a media device and/or content presented thereby using natural language prompts.

SUMMARY

Provided herein are system, apparatus, article of manufacture, method and/or computer program product embodiments, and/or combinations and sub-combinations thereof, for personalizing a user interface (UI) of a media device or content presented thereby. An example embodiment operates by obtaining a first natural language user input, providing the first natural language user input to a personalization language model that is configured to interpret different natural language user inputs to respectively determine different update tasks invoked thereby, the different update tasks including a UI update task that updates the UI of the media device and a content update task that updates the content presented by the media device, receiving from the personalization language model a first update task determined thereby based at least on the first natural language user input, generating one or more first application programming interface (API) calls based on the first update task, and placing the one or more first API calls to a service that is configured to implement the first update task based on the one or more first API calls.

In some aspects, the first update task comprises the UI update task and placing the one or more first API calls to the service that is configured to implement the first update task based on the one or more first API calls comprises placing the one or more first API calls to a service that is configured to implement the UI update task based on the one or more first API calls.

In some aspects, the first update task comprises the content update task and placing the one or more first API calls to the service that is configured to implement the first update task based on the one or more first API calls comprises placing the one or more first API calls to a service that is configured to implement the content update task based on the one or more first API calls.

In some aspects, obtaining the first natural language user input comprises receiving a voice data representation of the first natural language input, converting the voice data representation of the first natural language input into a text representation of the first natural language input, and transforming the text representation of the first natural language input into a format suitable for processing by the personalization language model.

In some aspects, obtaining the first natural language user input comprises receiving a text representation of the first natural language input and transforming the text representation of the first natural language input into a format suitable for processing by the personalization language model.

In some aspects, receiving from the personalization language model the first update task determined thereby based at least on the first natural language user input comprises receiving from the personalization language model one of a real time update task or an offline update task.

In some aspects, receiving from the personalization language model the first update task determined thereby based at least on the first natural language user input comprises receiving from the personalization language model a time-bound update task.

In some aspects, receiving from the personalization language model the first update task determined thereby based at least on the first natural language user input comprises receiving from the personalization language model an update task determined thereby based on the first natural language user input and a particular UI context associated with the UI of the media device.

In some aspects, receiving from the personalization language model the first update task determined thereby based at least on the first natural language user input comprises receiving from the personalization language model an update task having a particular scope. For example, the update task having the particular scope may comprise the UI update task having a particular scope of system, channel, page, row, content, navigation, summarization, transition, or metadata. As another example, the update task having the particular task may comprise the content update task having a particular scope of user interest, content removal, content filtering, context-aware processing, time-bound processing, item group processing, or custom complex queries.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
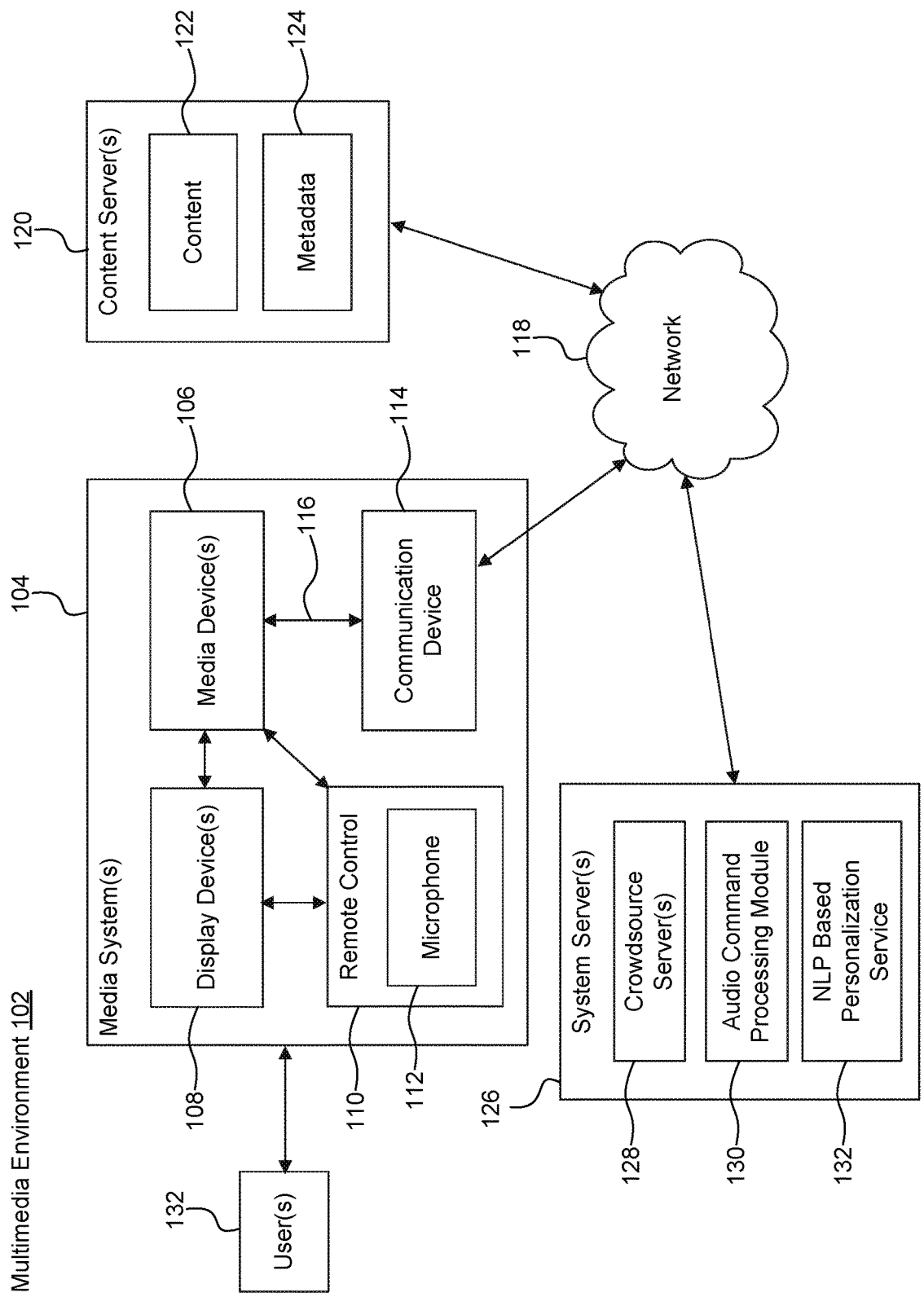
FIG. 1 illustrates a block diagram of a multimedia environment, according to some embodiments.

Owing to an increased availability and popularity of streaming media devices such as smart televisions (TVs) and streaming media players, more and more users are cancelling subscriptions to multichannel TV services delivered over cable or satellite (sometimes referred to as "cutting the cord") in favor of viewing content streamed over the internet. To view streaming content, a user may interact with a user interface (UI) of a streaming media device using a remote control provided therewith. Such remote controls are typically small, lightweight devices specifically designed to be operated while held in one hand. Due to the constraints associated with such a design, such remote controls typically include only a relatively small number of buttons and a finger-operated track pad or directional pad (D-pad) for UI navigation.

To manipulate and/or customize a UI of a streaming media device or content presented thereby, a user may be required to interact with various buttons, menus or other UI controls presented on a TV screen. If such interaction were carried out on a laptop or mobile phone, these UI controls could be easily accessed using a mouse or touchpad operated point-and-click interface or a finger-operated touch interface, respectively. However, interacting with a UI displayed on a TV screen using a remote control can be a cumbersome and frustrating experience for a user due to the limited set of mechanical controls provided by the remote. For example, simply navigating from one UI control to another UI control on the screen can require multiple button presses and/or touch pad/D-pad interactions.

A streaming application executing on a streaming media device may present a user with a list of content items, such as movies and TV shows. These content items may be represented as thumbnails or tiles arranged in rows. The user may scroll through the various rows and selectively interact with a particular content item to obtain information about the content item or to launch playback thereof. Some streaming applications determine which content items to present to the user based on the popularity of the content items with respect to a user base, with the most popular content items being recommended to the user. Some streaming applications utilize a recommender system to infer user preferences based on past user-item interactions and/or a user profile. The inferred user preferences may also be used to determine which content items will be presented to the user.

However, such streaming applications may present users with content items in which they have little or no interest. This may occur, for example, because a user is not interested in content items that are popular with the user base as a whole. This may also occur, for example, when a user is new to the streaming application and there is not enough historical user-item interaction data upon which a recommender system can operate (the so called "cold start problem") or when a user's interests evolve over time in a manner that cannot be adequately captured by the recommender system. When a streaming application continually presents content items in which a user has little or no interest, this can result in user dissatisfaction and disengagement.

Provided herein are system, apparatus, device, method and/or computer program product embodiments, and/or combinations and sub-combinations thereof, for enabling a user to personalize a UI of a media device or content presented thereby that may address one or more of the foregoing issues. An example embodiment operates by obtaining a first natural language user input, providing the first natural language user input to a personalization language model that is configured to interpret different natural language user inputs to respectively determine different update tasks invoked thereby, the different update tasks including a UI update task that updates the UI of the media device and a content update task that updates the content presented by the media device, receiving from the personalization language model a first update task determined thereby based at least on the first natural language user input, generating one or more first application programming interface (API) calls based on the first update task, and placing the one or more first API calls to a service that is configured to implement the first update task based on the one or more first API calls.

Among other features and advantages, embodiments described herein may enable a user to manipulate and/or customize a UI of a streaming media device or content presented thereby using natural language prompts, such as but not limited to voice prompts. In embodiments in which voice prompts are supported, the user can avoid the aforementioned cumbersome and frustrating experience of trying to manipulate and/or customize the UI of the media device or content presented thereby using a typical handheld remote control device with only a limited set of mechanical controls.

Furthermore, embodiments described herein may enable a user to provide natural language input about content items that can be taken into account by a streaming media application in determining which content items should be recommended or presented to the user. By leveraging such explicit user input relating to content items, such embodiments may identify content items of interest to a user more effectively than systems that rely only on content item popularity or inferred user preferences based on past user-item interactions and/or user profiles. By more effectively identifying content items of interest to the user, the streaming application can increase user satisfaction and engagement.

These and various other features and advantages of a natural language processing (NLP) based system for personalizing a media device UI and content presented thereby in accordance with various embodiments will be described in detail herein. Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to,"

"attached," "linked," "combined" and similar terms may refer to physical, electrical, magnetic, logical, etc., connections, unless otherwise specified herein.

Media device 106 may be a streaming media device such as a smart television (TV) or streaming media player, DVD or BLU-RAY device, audio/video playback device, cable box, and/or digital video recording device, to name just a few examples. Display device 108 may be a monitor, TV, computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
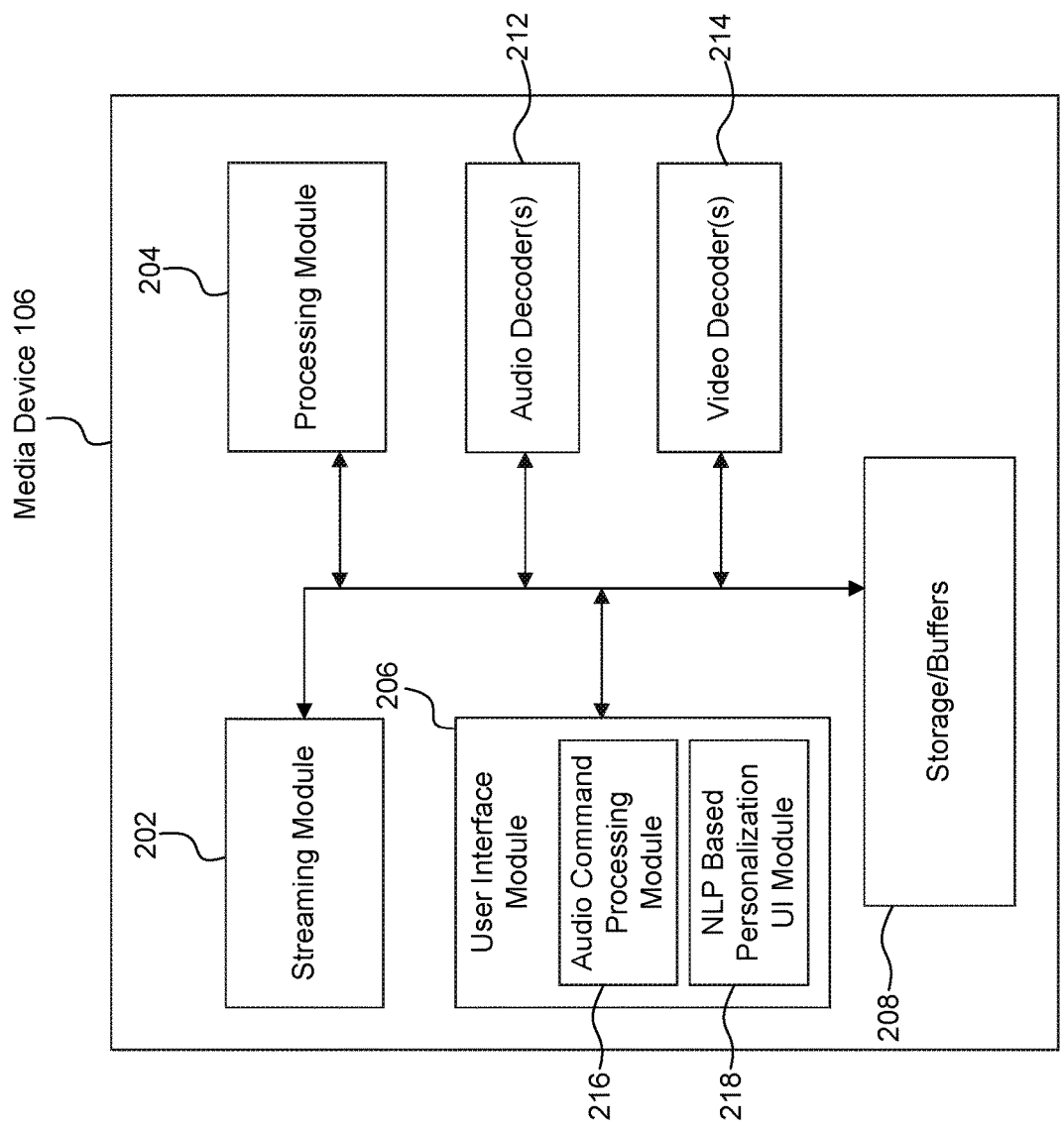
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

System server(s) 126 may also include a natural language processing (NLP) based personalization service 132. NLP based personalization service 132 may obtain natural language input from a user (e.g., user 132) and, based thereon, personalize or otherwise update a UI associated with media device 106 and/or content presented thereby. The UI of media device 106 may be, for example and without limitation, a UI of an operating system executing on media device 106 or a UI of a streaming media application or other software executing on media device 106. The natural language input may be provided by user 132, for example, as natural language voice input that is captured by microphone 112 of remote control 110, transferred from remote control 110 to media device 106, and then transmitted from media device 106 to NLP based personalization service 132 for processing thereby. The natural language input may also be provided by user 132 in the form of natural language text input that is typed or otherwise entered into the aforementioned UI of media device 106 (e.g., into a chatbot interface component of the UI) using remote control 110 or other suitable input device.

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

As further shown in FIG. 2, user interface module 206 may include an NLP based personalization UI module 218. NLP based personalization UI module 218 may enable a user (e.g., user 132) to submit natural language input that may be used by NLP based personalization service 132 to personalize or otherwise update a UI associated with media device 106 and/or content presented thereby. For example, NLP based personalization UI module 218 may obtain natural language voice input from user 132 that is captured by microphone 112 of remote control 110 and transmit such voice input to NLP based personalization service 132 for processing thereby. As another example, NLP based personalization UI module 218 may obtain natural language text input from user 132 that is typed or otherwise entered into the aforementioned UI of media device 106 (e.g., into a chatbot interface component of the UI) using remote control 110 or other suitable input device and transmit such text input to NLP based personalization service 132 for processing thereby.

NLP Based System for Media Device UI and Content Personalization

Figure 3:
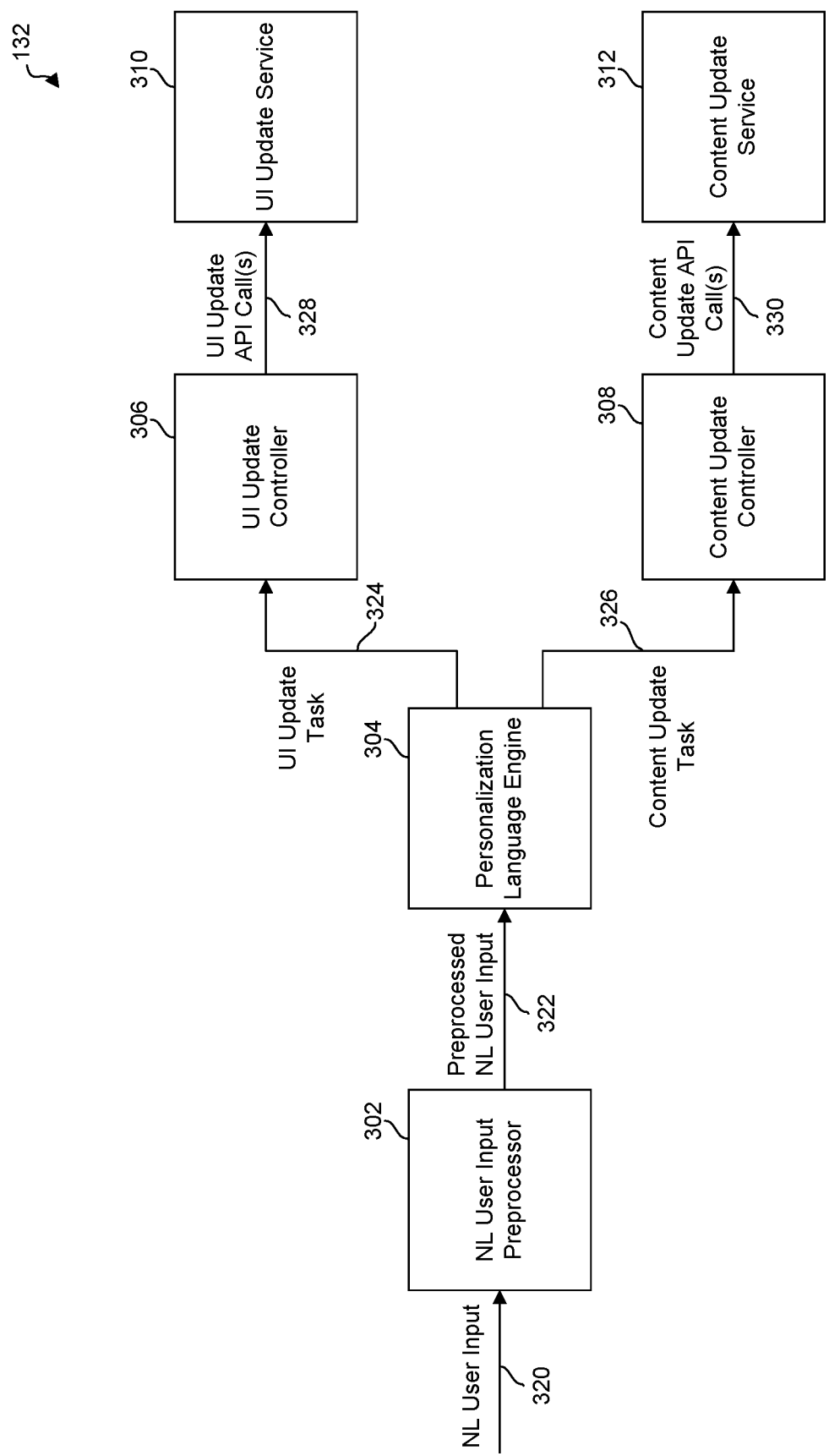
FIG. 3 illustrates a block diagram of a natural language processing (NLP) based personalization service, according to some embodiments.

FIG. 3 illustrates a block diagram of NLP based personalization service 132, according to some embodiments. As noted above, NLP based personalization service 132 may be implemented by system servers(s) 126 of multimedia environment 102.

As shown in FIG. 3, NLP based personalization service 132 may include a natural language (NL) user input preprocessor 302, a personalization language engine 304, a UI update controller 306, a content update controller 308, a UI update service 310 and a content update service 312. Each of these components of NLP based personalization service 132 may be implemented as processing logic that can comprise hardware (e.g., circuitry, dedicated logic, programmable logic, microcode, etc.), software (e.g., instructions executing on a processing device), or a combination thereof. Each of these components of NLP personalization service 132 will now be described.

NL user input preprocessor 302 may be configured to receive NL user input 320 and to preprocess NL user input 320 to generate preprocessed NL user input 322. NL user input 320 may be received, for example, from NLP based personalization UI module 218 of media device 106. NL user input 320 may comprise, for example, NL voice user input spoken by a user (e.g., user 132), captured by one or more microphones (e.g., microphone 112 of remote control 110), digitized, and passed to NLP based personalization service 132 by NLP based personalization UI module 218. NL user input 320 may also comprise, for example, NL text user input entered by a user (e.g., user 132) into a UI of a media device 106 (e.g., into a chatbot component of the UI) using remote control 110 or other suitable input device and passed to NLP based personalization service 132 by NLP based personalization UI module 218.

It is noted that NL user input 320 may be obtained in other ways and from other sources than those described above. For example, NL input 320 may be obtained or derived from user feedback messages provided about a UI of media device 106 or content presented thereby, by user-posted online reviews that relate to a UI of media device 106 or content presented thereby, or any other source of user-generated natural language input.

The preprocessing of NL user input 320 by NL user input preprocessor 302 may entail transforming NL user input 320 into a format that is suitable for processing by a personalization language model of personalization language engine 304.

Personalization language engine 322 may be configured to receive preprocessed NL user input 322 and interpret the same to determine an update task invoked thereby. Personalization language engine 322 may be configured to interpret different NL user inputs to respectively determine different update tasks invoked thereby. The different update tasks may include one or more UI update tasks, each of which updates the UI of media device 106 in a particular manner, and one or more content update tasks, each of which updates or otherwise performs operations with respect to content presented to a user by media device 106 in a particular manner. For example, personalization language engine 304 may interpret preprocessed NL user input 322 to determine a UI update task 324, a content update task 326, or both UI update task 324 and content update task 326.

UI update controller 306 may be configured to receive UI update task 324 from personalization language engine 304 and generate one or more application programming interface (API) calls 328 to UI update service 310 based on UI update task 324. API call(s) 328 may be configured to cause UI update service 310 to implement UI update task 324 with respect to the UI of media device 106.

UI update service 310 may be configured to receive UI update API call(s) 328 from UI update controller 306 and to execute UI update API call(s) 328, thereby causing the UI of media device 106 to be modified in a manner specified by UI update API call(s) 328.

Content update controller 308 may be configured to receive content update task 326 from personalization language engine 304 and generate one or more API calls 330 to content update service 312 based on content update task 326. API call(s) 330 may be configured to cause content update service 310 to implement content update task 326 with respect to the content presented via the UI of media device 106.

Content update service 312 may be configured to receive content update API call(s) 330 from content update controller 308 and to execute content update API call(s) 330, thereby causing the content presented via UI of media device 106 to be modified in a manner specified by content update API call(s) 330.

Figure 4:
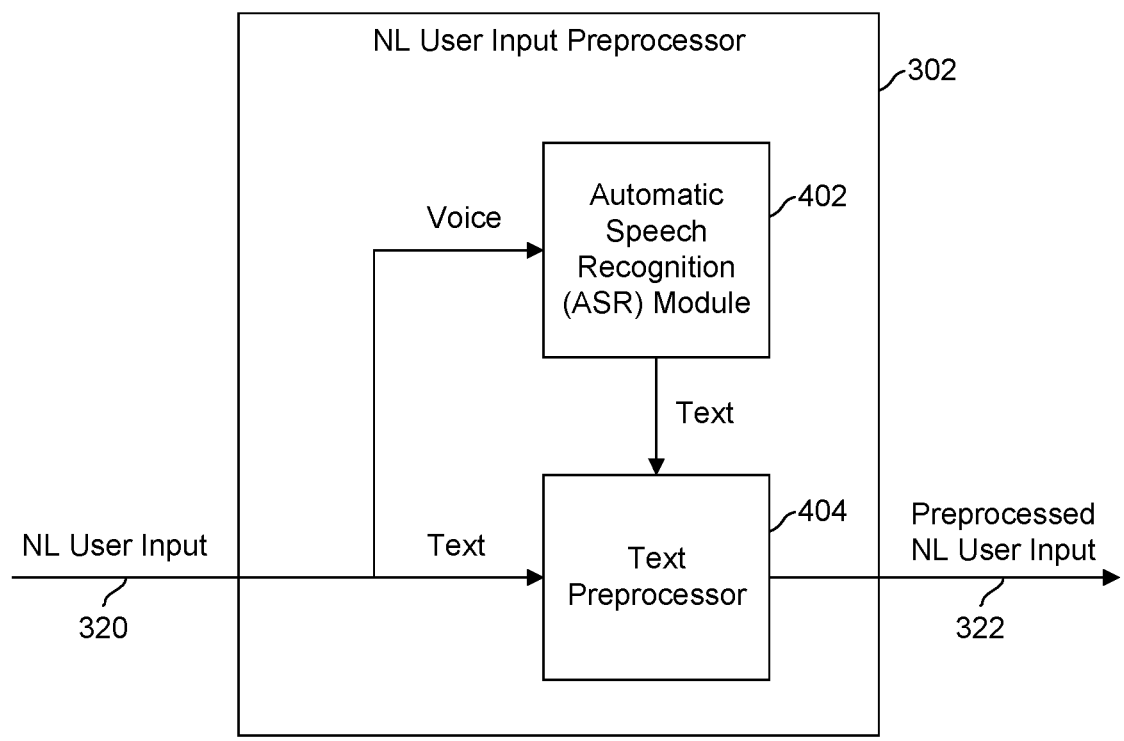
FIG. 4 illustrates a block diagram of a natural language (NL) user input preprocessor, according to some embodiments.

FIG. 4 illustrates a block diagram of NL user input preprocessor 302, according to some embodiments. As shown in FIG. 4, NL user input preprocessor 302 may include an automatic speech recognition (ASR) module 402 and a text preprocessor 404.

As noted above, NL user input 320 may be represented as voice data (e.g., a digitized representation of NL voice user input captured by a microphone) or as text. In a case in which NL user input 320 is represented as voice data, ASR module 402 may operate to receive the voice data representation of NL user input 320 and convert the voice data representation into a text representation of NL user input 320. ASR module 402 may utilize any of a variety of ASR algorithms to convert the voice data representation NL user input 320 into the text representation of NL user input 320, whether such algorithm is already known or hereafter developed.

Text preprocessor 404 may be configured to receive a text representation of NL user input 320 from media device 106 or ASR module 402, and to transform such text representation of NL user input 320 into a format that is suitable for processing by a personalization language model of personalization language engine 304, thereby generating preprocessed NL user input 322. The text preprocessing performed by text preprocessor 404 may include operations such as but not limited to tokenization (e.g., splitting a sentence into words), lower casing (e.g., converting a word to lower case), stop words removal (e.g., removing commonly used words such as "a", "an", "the', etc.), punctuation removal (e.g., removing punctuation marks), and stemming (e.g., transforming a word into a root form) or lemmatization (e.g., converting a word into a base form). The text preprocessing performed by text preprocessor 404 may further include converting a final text representation of NL user input 320 into a numeric form that is suitable for processing by a personalization language model of personalization language engine 304.

Figure 5:
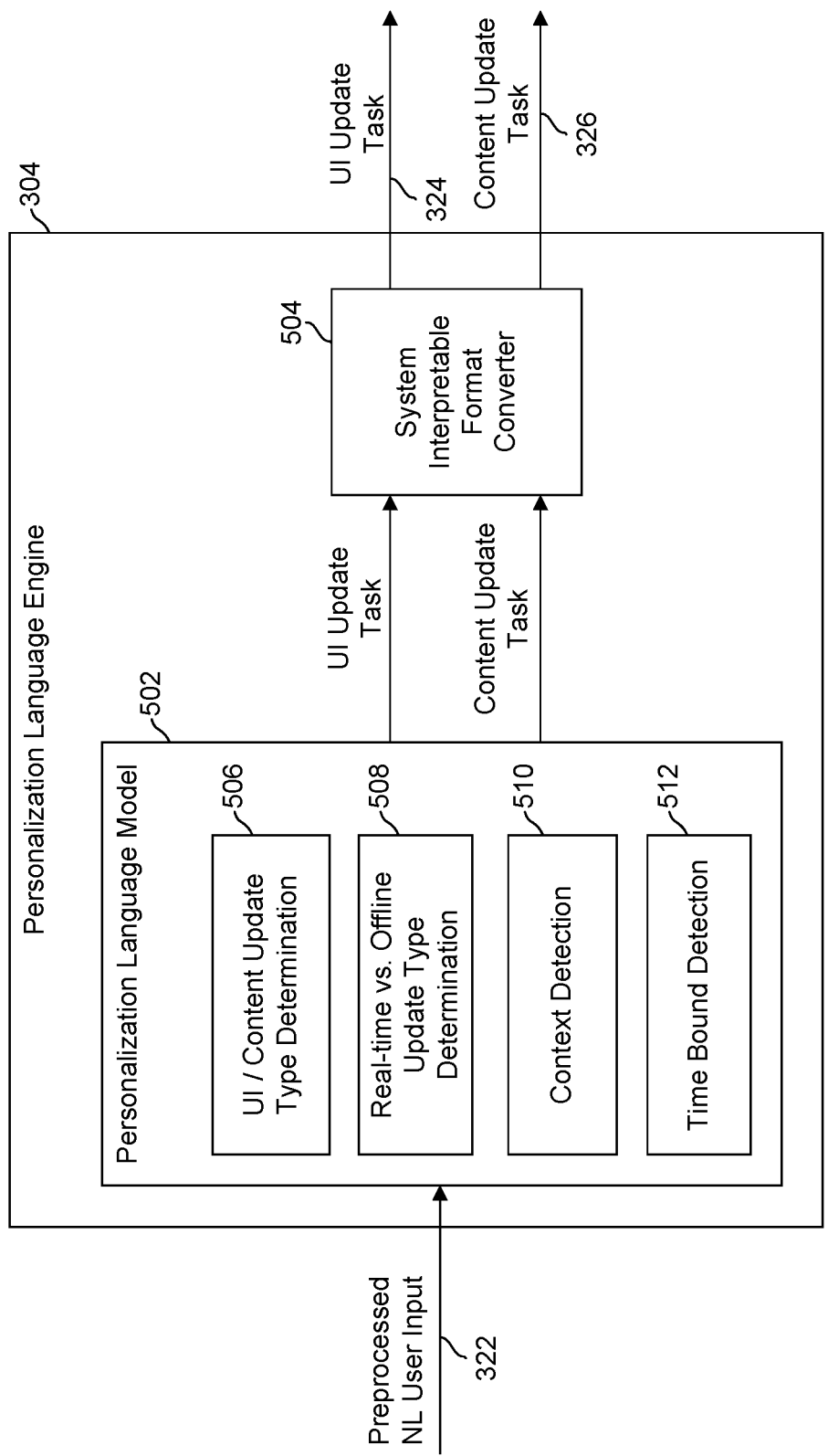
FIG. 5 illustrates a block diagram of a personalization language engine, according to some embodiments.

FIG. 5 illustrates a block diagram of personalization language engine 304, according to some embodiments. As shown in FIG. 5, personalization language engine 304 may include a personalization language model 502 and a system interpretable format converter 504.

Personalization language model 502 may be configured to receive preprocessed NL user input 322 and to interpret the same to determine if preprocessed NL user input 322 invokes one or more of a UI update task or a content update task. A UI update task may comprise any task that entails modifying a UI of media device 106 (e.g., a UI of an operating system executing on media device 106 and/or a UI of a streaming media application or other software executing on media device 106). A content update task may comprise any task that entails performing operations on content items presented to a user via a UI of media device 106 or that impacts which content items are presented to a user via a UI of media device 106.

Personalization language model 502 may comprise a large language model (LLM) that is trained using deep learning techniques on relatively large amounts of text data. Examples of well-known LLMs that may be used or adapted to implement personalization language model 502 include limitation Llama 2 or ChatGPT 3.5. Still other LLMs may be utilized, whether currently available or hereafter developed. Furthermore, personalization language model 502 may be implemented using other types of language models, including but not limited to a word n-gram language model, a maximum entropy language model, a skip-gram language model, or a recurrent neural network-based language model.

As shown in FIG. 5, personalization language model 502 may be adapted to perform a number of operations as part of interpreting preprocessed NL user input 322. These operations may include, for example, UI/content update type determination 506, real-time vs. offline update type determination 508, context detection 510 and time bound detection 512. Each of these operations will now be described.

UI/content update type determination 506 refers to the ability of personalization language model 502 to interpret preprocessed NL user input 322 to determine whether a UI update task is being invoked thereby, a content update task is being invoked thereby, or whether a UI update task and a content update task is being invoked thereby. Because personalization language model 502 is configured to recognize both types of updates, the same natural language interface can advantageously be used to trigger both UI updates and content updates. Examples of various types of UI updates and content updates will be described below.

Real-time vs. offline update type determination 508 refers to the ability of personalization language model 502 to interpret preprocessed NL user input 322 to determine whether such input invokes an update task that is to be performed in real time (e.g., during a current user interaction session with media device 106) or is to be performed offline (e.g., at some time after the current user interaction session with media device 106). For example, a real time content update may be invoked by the natural language prompt "show me horror movies", from which it may be inferred that the user desires the content update to be performed during a current session (e.g., as soon as is practicable within a current session). However, an offline content update may be invoked by the natural language prompt "show me horror movies around Halloween", from which it may be inferred that the user desires that a certain type of content be presented in a future session. In the case of an offline content update, NLP based personalization service 132 can merely log the content update request, but it need not immediately act on it.

The ability to distinguish between real-time and offline updates can advantageously enable NLP based personalization service 132 to defer the handling of offline updates to a future time, thereby freeing up computing resources to handle real-time updates in a high priority fashion, and thus reducing the latency with which they are executed.

An offline update may also encompass a type of update that NLP based personalization service 132 is not currently configured to execute, but that it may be configured to execute at a future time (e.g., based on a future update to NLP based personalization service 132). For example, if a certain number of users request a UI update or a content update that NLP based personalization service 132 does not currently support, the service can nevertheless log such requests and a developer of NLP based personalization service 132 can modify the service to support that UI update or content update to accommodate the user base.

Context detection 510 refers to the ability of personalization language model 502 to interpret preprocessed NL user input 322 based in part on a particular context associated with the UI of media device 106, such as a context associated with the UI of media device 106 at the time NL user input 320 was submitted by the user. For example, the context of the UI may be that a particular content item is currently highlighted or in focus and NL user input 320 may refer to the content item as "this" or "it". In further accordance with this example, the NL user input 320 may be "show me more items like this" or "move it to the top of my watchlist". Other examples of references in NL user input 320 that may be interpreted based on a particular context associated with the UI of media device 106 may include "this channel", "these channels", "this page", "this row", "these rows", "this content", "these items", "this menu", etc.

In certain implementations, personalization language model 502 may be configured to receive context information about the UI of media device 106 as an additional input and may utilize such additional input to assist in interpreting preprocessed NL user input 322. Such context information may be based on a text description of the state of the UI of media device 106 or an image of the state of the UI of media device 106. In a further implementation, personalization language model 502 may comprise a multi-modal language model that is adapted to interpret preprocessed NL user input 322 based both on the text of the NL user input and an image of the state of the UI of media device 106.

Time bound detection 512 refers to the ability of personalization language model 512 to interpret preprocessed NL user input 322 to determine whether an update task having a time restriction is being invoked thereby. For example, processed NL user input 322 may be interpreted as specifying a particular time period within which a user wishes to be presented with or recommended certain content, or within which a certain UI should be provided.

As further shown in FIG. 5, each UI update task and content update task identified by personalization language model may be passed to system interpretable format converter 504. System interpretable format converter 504 may be configured to convert the UI update task into a format that is interpretable by UI update controller 306, thereby generating UI update task 324. Likewise, system interpretable format converter 504 may be configured to convert the content update task into a format that is interpretable by content update controller 308, thereby generating content update task 326.

Figure 6:
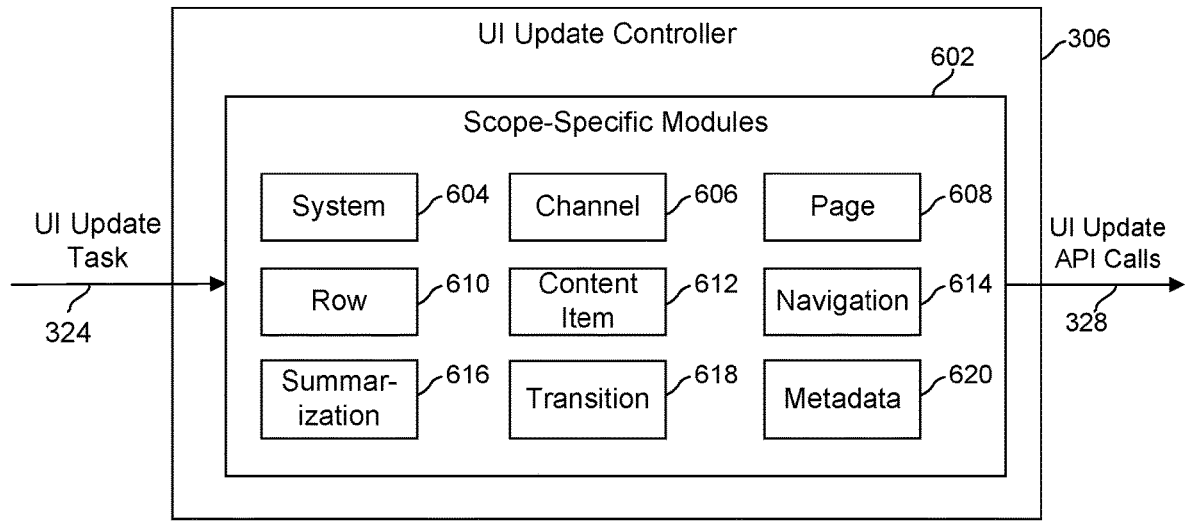
FIG. 6 illustrates a block diagram of a user interface (UI) update controller, according to some embodiments.

FIG. 6 illustrates a block diagram of UI update controller 306, according to some embodiments. As noted above, UI update controller 306 may be configured to receive UI update task 324 from personalization language engine 304 and generate API call(s) 328 to UI update service 310 based on UI update task 324. As shown in FIG. 6, UI update controller 306 may include a plurality of scope-specific modules 602. UI update controller 306 may be configured to determine a scope associated with UI update task 324 and activate one of scope-specific modules 602 based on the determined scope. The activated scope-specific module may then generate API call(s) 328, which are configured to cause UI update service 310 to implement UI update task 324 having the determined scope with respect to the UI of media device 106.

As shown in FIG. 6, scope-specific modules 602 may include a system module 604, a channel module 606, a page module 608, a row module 610, a content item module 612, a navigation module 614, a summarization module 616, a transition module 618 and a metadata module 620.

System module 604 may be configured to process UI updates having a system scope to generate the API call(s) for implementing the same. UI updates with a system scope may include updates directed to an operating system UI presented by media device 106. Examples of natural language prompts that may invoke a UI update with a system scope may include "change the theme", "move channel X to the top of the grid" or "change the aspect ratio".

Channel module 606 may be configured to process UI updates having a channel or application scope to generate the API call(s) for implementing the same. UI updates with a channel or application scope may include updates directed to a channel or application UI presented by media device 106. Examples of natural language prompts that may invoke a UI update with channel or application scope may include "show the featured row of this channel on homepage" or "show me page X as the landing page whenever I launch this channel".

Page module 608 may be configured to process UI updates having a page scope to generate the API call(s) for implementing the same. UI updates with a page scope may include updates directed to one or more pages that are accessible via a channel or application (e.g., a home page, a category or collection page, or a details page for a specific content item). Examples of natural language prompts that may invoke a UI update with a page scope may include "highlight the top three rows for this page" or "pin continue watching to the top of this page."

Row module 610 may be configured to process UI updates having a row scope to generate the API call(s) for implementing the same. UI updates with a row scope may include updates directed to one or more rows of content items (e.g., represented as thumbnails or tiles) that are displayed in a channel or application UI. Examples of natural language prompts that may invoke a UI update with a row scope may include "don't show this row", "see all items of this row", or "pin this row to the top". UI updates with a row scope may also customize an aspect ratio of a row or the look of a row. Examples of natural language prompts that may invoke a UI update of this type may include "show me bigger tiles for this row always" or "highlight this row always".

Content item module 612 may be configured to process UI updates having a content item scope to generate the API call(s) for implementing the same. UI updates with a content item scope may include updates directed to one or more content items (e.g., represented as thumbnails or tiles) that are displayed in a channel or application UI. Examples of natural language prompts that may invoke a UI update with a content item scope may include "pin this content to the first position" or "make the artwork child-safe".

Navigation module 614 may be configured to process UI updates having a navigation scope and to generate the API call(s) for implementing the same. UI updates with a navigation scope may include updates directed to one or more menus or buttons used to navigate a UI (e.g. system UI or channel/application UI) presented by media device 106. An example of a natural language prompt that may invoke a UI update with a navigation scope may include "place the navigation menu on the right".

Summarization module 616 may be configured to process UI updates having a summarization scope to generate the API call(s) for implementing the same. UI updates with a summarization scope may include updates that cause the UI to present a summarization of one or more content items. Such summaries may comprise, for example, textual summaries or video summaries (e.g., a video with relatively short clips from a plurality of content items). An example of a natural language prompt that may invoke a UI update with a summarization scope may include "summarize the content of this row".

Transition module 618 may be configured to process UI updates having a transition scope and to generate the API call(s) for implementing the same. UI updates with a transition scope may include updates that cause the UI to automatically transition between content items, such as auto scrolling through content items, auto playing content items, or repeating content items. Examples of natural language prompts that may invoke a UI update with a transition scope may include "show me trailers of all movies in this row one-by-one", "play content in this row one after another" or "repeat this video".

Metadata module 620 may be configured to process UI updates having a metadata scope and to generate the API call(s) for implementing the same. UI updates with a metadata scope may include updates that cause the UI to present additional information about a content item. Such additional information could include, for example, cast, genre, release year, ratings, or the like. Such information may be presented by the UI without having to navigate to a content item details page (e.g., it could show up directly on the thumbnail or tile for the content item, or for all content items in a row or on a page). Examples of natural language prompts that may invoke a UI update with a metadata scope may include "who is the actor/director of the movie?" or "show me the genre of all the content in this row".

The above-described system can enable a user to easily customize UI elements including but not limited to application tiles, navigation menu items, advertisements, rows of content items, or the like. A user can carry out such customizations using natural language prompts, as opposed to having to navigate through a button and/or menu-based interface to select the right setting, and potentially having to learn a different workflow for each setting. The above-described system can enable a user to use natural language prompts to perform operations such as hiding or showing side panel items, moving streaming application or channel tiles to specific positions, or setting a UI theme through natural language prompts.

In certain implementations, NLP based personalization service 132 may request that the user confirm a UI update before NLP based personalization service 132 executes the update. For example, NLP based personalization service 132 may display a message describing the determined UI update and/or demonstrate what the UI will look like with the determined UI update, and then ask the user to confirm such UI update before executing it.

Figure 7:
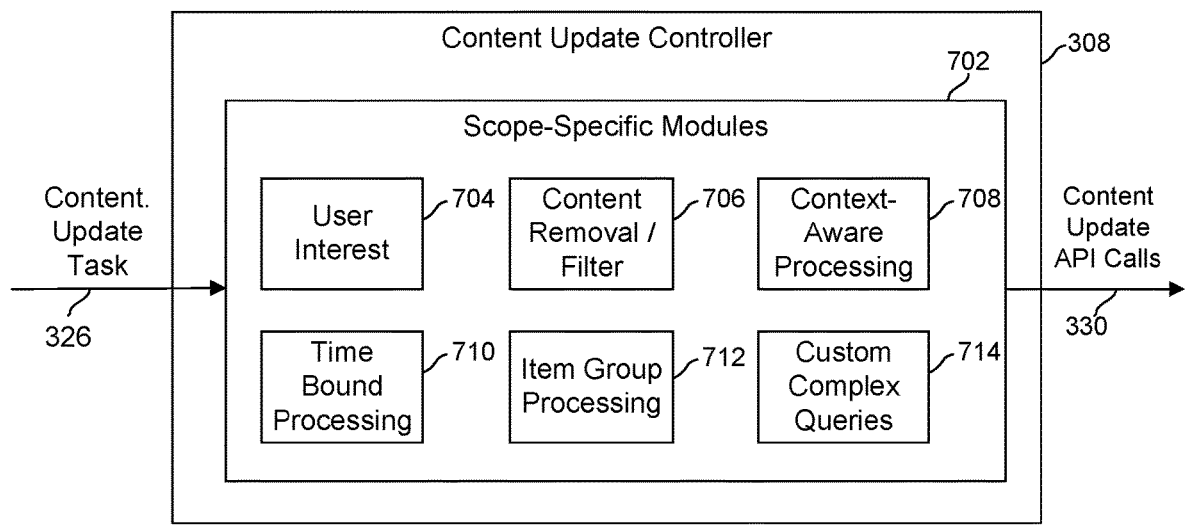
FIG. 7 illustrates a block diagram of a content update controller, according to some embodiments.

FIG. 7 illustrates a block diagram of content update controller 308, according to some embodiments. As noted above, content update controller 308 may be configured to receive content update task 326 from personalization language engine 304 and generate API call(s) 330 to content update service 312 based on content update task 326. As shown in FIG. 7, content update controller 308 may include a plurality of scope-specific modules 702. Content update controller 308 may be configured to determine a scope associated with content update task 326 and activate one of scope-specific modules 702 based on the determined scope. The activated scope-specific module may then generate API call(s) 330, which may be configured to cause content update service 312 to implement content update task 326 having the determined scope with respect to the content presented via the UI of media device 106.

As shown in FIG. 7, scope-specific modules 702 may include a user interest module 704, a content removal/filter module 706, a context-aware processing module 708, a time bound processing module 710, an item group processing module 712, and a custom complex queries module 714.

User interest module 704 may be configured to process content updates having a user interest scope to generate the API call(s) for implementing the same. Content updates with a user interest scope may include updates that specify an interest of a user that can be used by a recommender system to recommend or present content. Such content updates may provide a way for a user to explicitly customize their interests and let the system know what they wish to see both in the short-term (e.g., as a real-time content update during a current session) and in the long term (e.g., as an offline content update reflected in a future session). Examples of natural language prompts that may invoke a content update with a user interest scope may include "I love romantic comedies" or "I prefer getting fresh and new content instead of content similar to my watch history".

Content removal/filter module 706 may be configured to process content updates having a content removal/filter scope to generate the API call(s) for implementing the same. Content updates with a content removal/filter scope may include updates that cause certain content items not to be recommended or presented to a user. Such content updates may provide a user with a means for preventing the system from presenting them with content items that they may feel are repetitive or uninteresting. Such content may be unlikely to be interacted with by the user, may unnecessarily occupy valuable real estate on the screen, and may increase the time it takes for the user to find content items in which they are interested. Examples of natural language prompts that may invoke a content update with a content removal/filter scope may include "I don't want to see X again", "remove item A from my recommendations" or "remove item A from the playlist".

Context-aware processing module 708 may be configured to process content updates having a context-aware processing scope to generate the API call(s) for implementing the same. Content updates with a context-aware processing scope may include updates that take actions based on a current context of a UI presented by media device 106. For example, the context of the UI may be that a particular content item is currently highlighted or in focus, and the content update may refer to the particular content item as "this content" or "it". Examples of natural language prompts that may invoke a content update of this type may include "stop showing me this content and any content similar to it", "what is the best way to watch this content?", "what is the cheapest way to watch this content?", "where can I watch this content without ads?" or "show me the trailer for this movie".

In certain implementations, contextual automated content recognition (ACR) may be used to queue up certain content items when a user is watching, for instance, live or broadcast TV. In such a scenario, the user can say "can I watch this later?" and the system will find the video on demand (VOD) content for the specific content being shown and add it to a watch queue.

Content updates with a context-aware processing scope may be used to enable a user to ask the system why they are being shown certain content, thus providing an explainability feature. For example, a user may inquire "why am I seeing this content?".

Time bound processing module 710 may be configured to process content updates having a time bound processing scope to generate the API call(s) for implementing the same. Content updates with a time-bound scope may include updates that specify a particular time period within which a user wishes to be presented with or recommended certain content. Examples of natural language prompts that may invoke a content update having a time bound processing scope may include "show me child-safe content for the weekend", "show me romantic comedies today" or "shown only child safe content from 9 AM to 6 PM".

Item group processing module 712 may be configured to process content updates having an item group processing scope to generate the API call(s) for implementing the same. Content updates with an item group processing scope may include updates that perform operations on a group of content items. Examples of natural language prompts that may invoke a content update having an item group processing scope may include "save item A, B and C to the save list", "remove item A, B and C from watch history" or "create a playlist with content from item A, B and C".

Custom complex queries module 714 may be configured to process content updates having a custom complex query scope to generate the API call(s) for implementing the same. Content updates with a custom complex query scope may include updates that retrieve content to be presented to a user using complex search queries such as search queries that combine multiple filters or search queries that retrieve content based on plot or specific aspects such as child-safe content. Examples of natural language prompts that may invoke a content update having a custom complex query scope may include "show me content from X producer released after X year", "show me all the content with X and Y actors in it", "show me comedy movies with X actor", "show me movies in which a group of friends go on a trip", or "show me child-safe movies".

The above-described system may enable a user to provide explicit natural language input that can be used by a recommender system to assist, modify and/or curate a personalized experience with respect to content recommendation/presentation. For example, the system may enable a user to provide rich information that can assist a recommender system in providing better, more meaningful recommendations.

The above-described system may also enable a user to: explicitly rank certain content items or rows higher or lower if the user wishes to by issuing natural language commands such as "show action content first" or "show me newly released content first"; issue user-interest queries such as "hide sports recommendations", "recommend romantic movies on the weekends" or "I am interested in action-comedy"; perform queries for an explicit exploitation strategy such as "show me recommendations based only on my watch history"; or perform queries for an explicit exploration strategy such as "show me recommendations that are completely different from what I have watched before".

As can be seen from the foregoing, NLP based personalization UI module 218 and NLP based personalization service 132 may operate together to provide a channel by which a user can provide explicit natural language input concerning a UI of media device 106 or content presented thereby. For example, in certain implementations, a user can use voice or a chatbot interface to execute complex queries relating to the UI of media device 106 or content presented thereby. Personalization language model 502 can map user instructions provided in this manner to actionable tasks and update the UI of media device 106 and/or content presented thereby accordingly.

Figure 8:
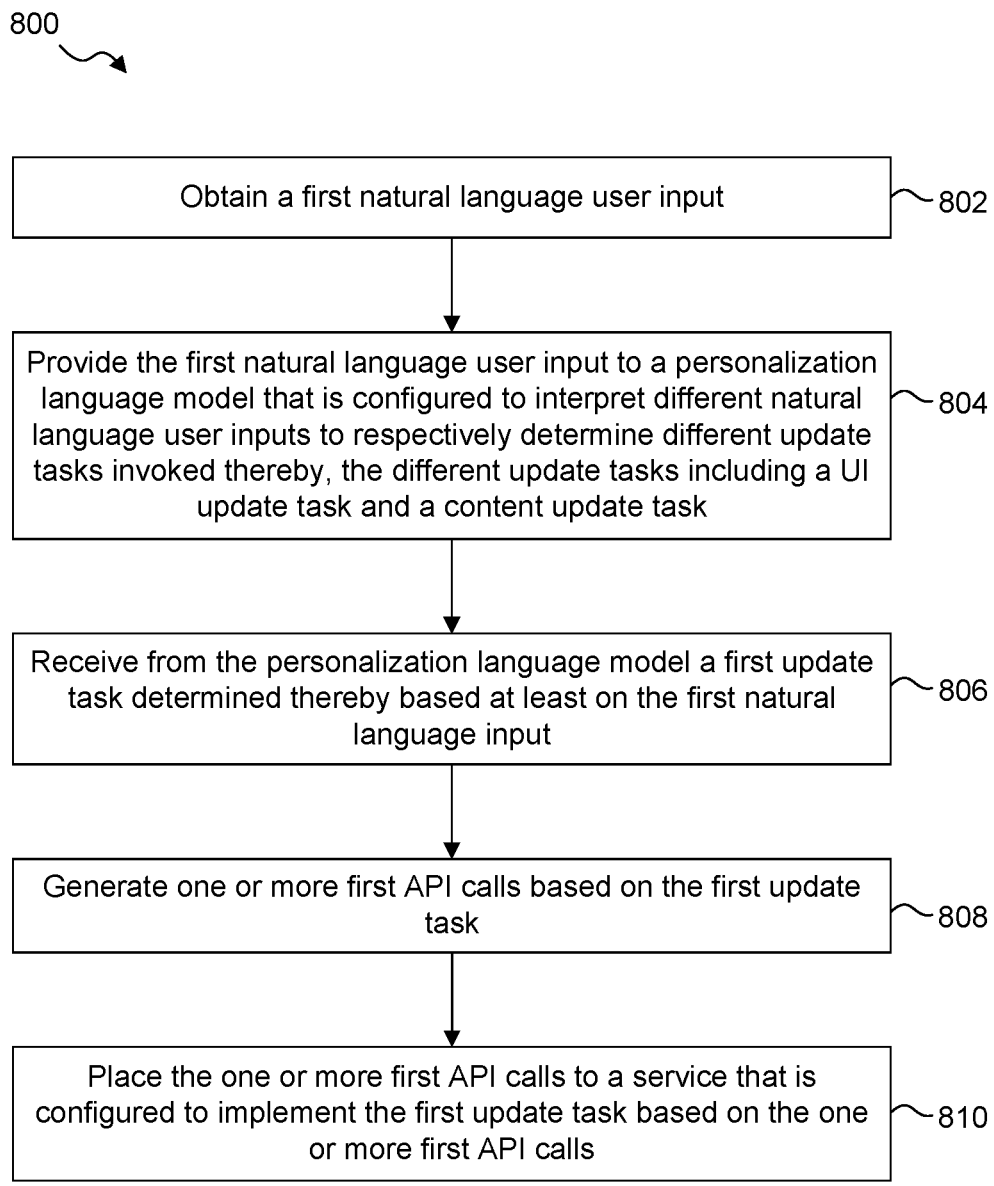
FIG. 8 illustrates a flow diagram of a method for personalizing a UI of a media device or content presented thereby, according to some embodiments.

FIG. 8 illustrates a flow diagram of a method 800 for personalizing a UI of a media device (e.g., media device 106) or content presented thereby, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIGS. 1, 3 and 5. However, method 800 is not limited to those example embodiments.

In 802, personalization language engine 302 obtains a first natural language user input (e.g., preprocessed NL user input 322).

In 804, personalization language engine 304 provides the first natural language user input to personalization language model 502 that is configured to interpret different natural language user inputs to respectively determine different update tasks invoked thereby, the different update tasks including a UI update task that updates the UI of media device 106 (e.g., UI update task 324) and a content update task that updates the content presented by media device 106 (e.g., content update task 326).

In 806, an update controller receives from personalization language model 502 a first update task determined thereby based at least on the first natural language input. This may entail, for example, UI update controller 306 receiving UI update task 324 from personalization language model 502, wherein UI update task 324 is determined by personalization language model 502 based at least on the first natural language input. This may also entail, for example, update controller 308 receiving content update task 326 from personalization language model 502, wherein content update task 326 is determined by personalization language model 502 based at least on the first natural language input.

In certain scenarios, the first update task received by the update controller from personalization language model 502 may comprise one of a real time update task or an offline update task. The first update task received by the update controller from personalization language model 502 may also comprise a time-bound update task. The first update task received by the update controller from personalization language model 502 may comprise an update task determined by personalization language model 502 based on the first natural language input and a particular UI context associated with the UI of media device 106.

The first update task received by the update controller from personalization language model 502 may comprise an update task having a particular scope. For example, the first update task received by the update controller from personalization language model 502 may comprise a UI update task (e.g., UI update task 324) having a particular scope of system, channel, page, row, content, navigation, summarization, transition or metadata. As another example, the first update task received by the update controller from personalization language model 502 may comprise a content update task (e.g., content update task 326) having a particular scope of user interest, content removal, content filtering, context-aware processing, time-bound processing, item group processing or custom complex queries.

Figure 9:
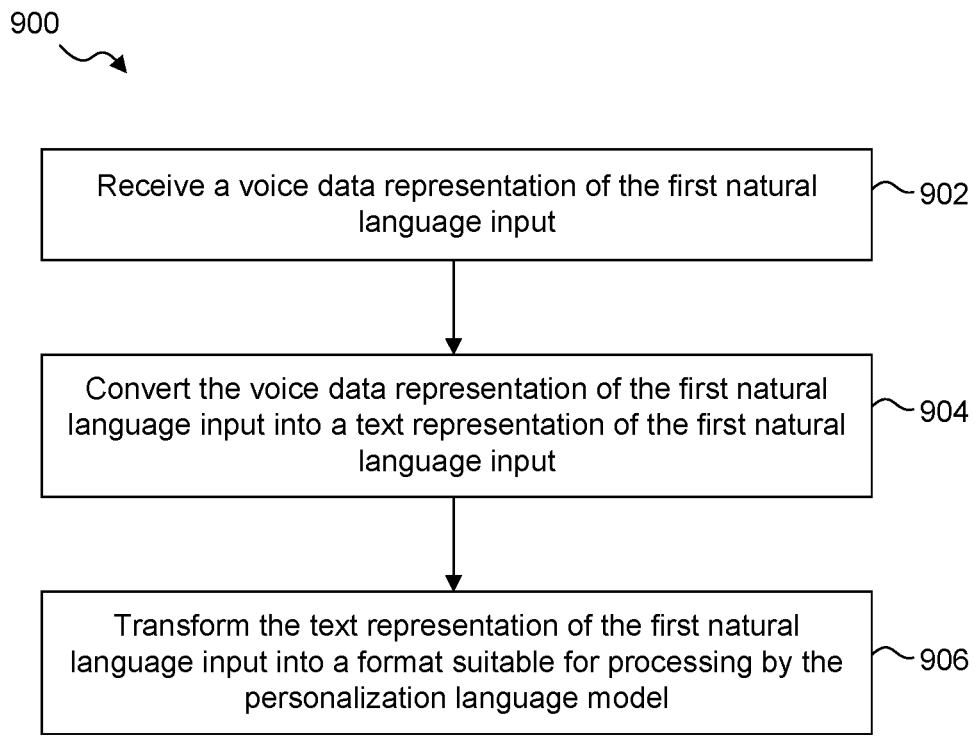
FIG. 9 illustrates a flow diagram of a method for obtaining a first natural language user input, according to some embodiments.

FIG. 9 illustrates a flow diagram of a method 900 for obtaining a first natural language user input, according to some embodiments. Method 900 may be used to implement 802 of method 800. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIGS. 2-5. However, method 900 is not limited to those example embodiments.

In 902, NL user input preprocessor 302 receives a voice data representation of the first natural language input (e.g., NL user input 320) from NLP based personalization UI module of media device 106.

In 904, ASR module 402 converts the voice data representation of the first natural language input into a text representation of the first natural language input.

In 906, text preprocessor 404 transforms the text representation of the first natural language input into a format suitable for processing by personalization language model 502 (e.g., thereby generating preprocessed NL user input 322).

Figure 10:
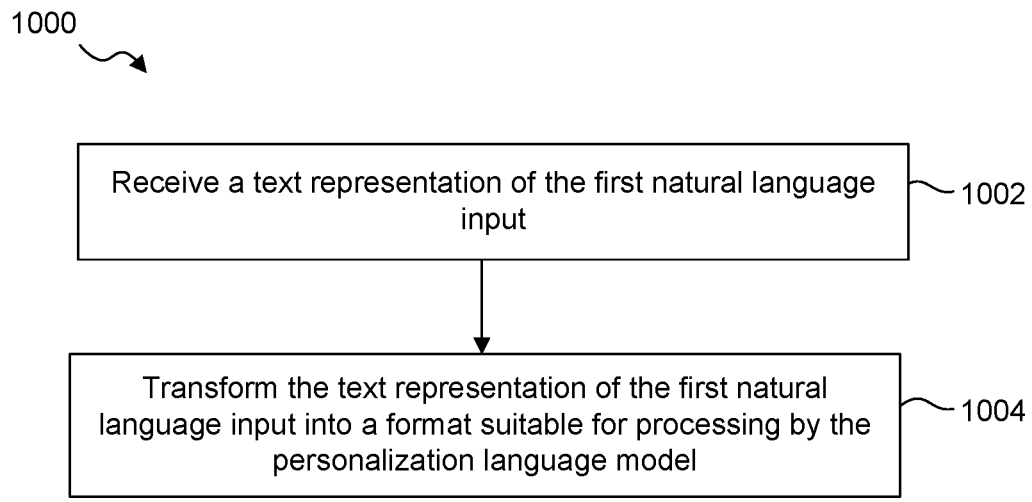
FIG. 10 illustrates a flow diagram of an alternate method for obtaining a first natural language user input, according to some embodiments.

FIG. 10 illustrates a flow diagram of an alternate method 1000 for obtaining a first natural language user input, according to some embodiments. Method 1000 may be used to implement 802 of method 800. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIGS. 2-5. However, method 900 is not limited to those example embodiments.

In 1002, NL user input preprocessor 302 receives a text representation of the first natural language input (e.g., NL user input 320) from NLP based personalization UI module of media device 106.

In 1004, text preprocessor 404 transforms the text representation of the first natural language input into a format suitable for processing by personalization language model 502 (e.g., thereby generating preprocessed NL user input 322).

Example Computer System

Figure 11:
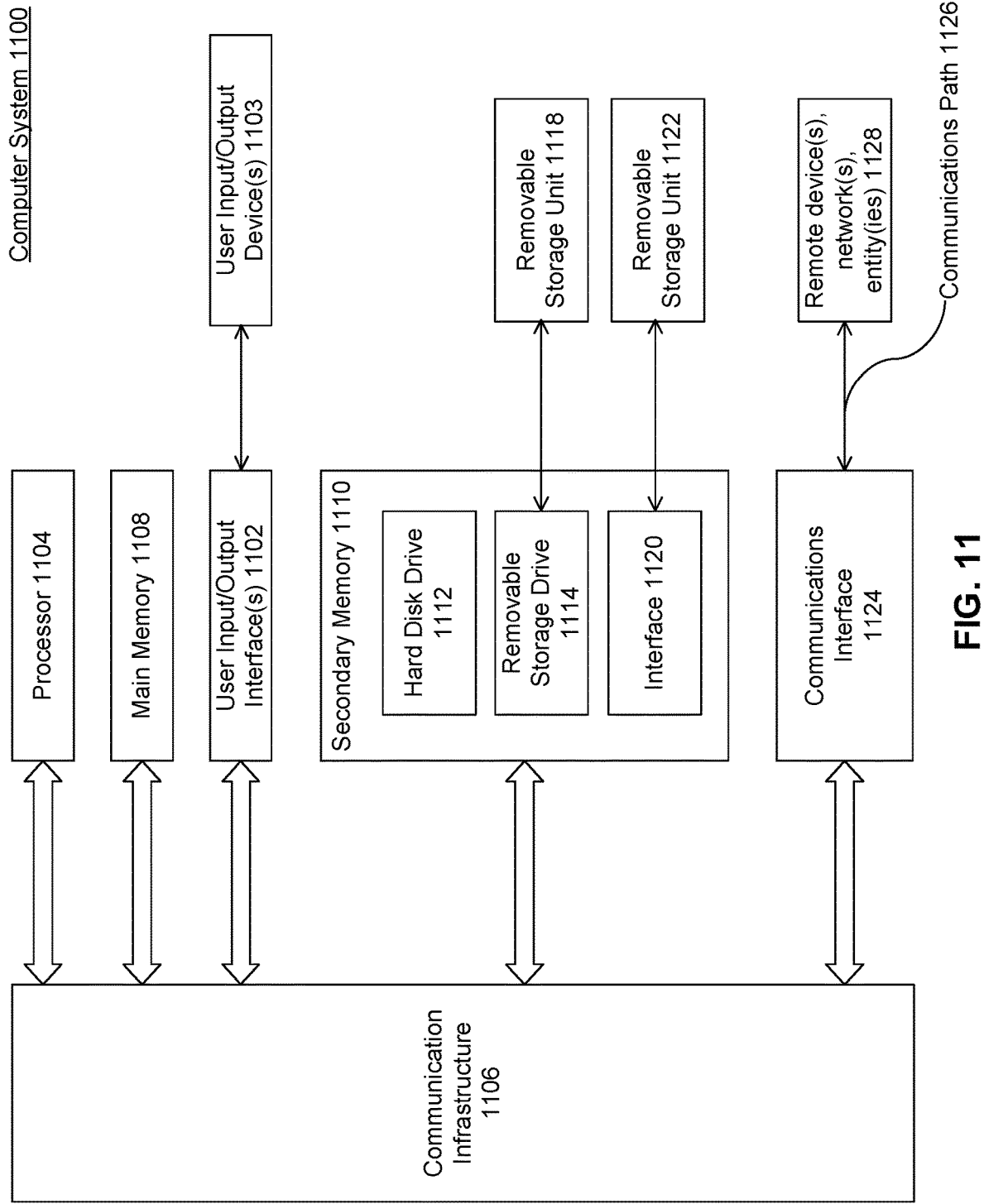
FIG. 11 illustrates an example computer system useful for implementing various embodiments.

Various embodiments may be implemented, for example, using one or more well-known computer systems, such as computer system 1100 shown in FIG. 11. For example, one or more of media device 106, content server(s) 120, system server(s) 126, NLP based personalization service 132, NL user input preprocessor 302, personalization language engine 304, UI update controller 306, content update controller 308, UI update service 310, content update service 312, ASR module 402, text preprocessor 404, personalization language model 502, system interpretable format converter 504, any of scope-specific modules 602, or any of scope-specific modules 702 may be implemented using combinations or sub-combinations of computer system 1100. Also or alternatively, one or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for personalizing a user interface (UI) of a media device or content presented thereby, comprising:
   obtaining, by at least one computer processor, a first natural language user input;
   providing the first natural language user input to a personalization language model that is configured to interpret different natural language user inputs to respectively determine different update tasks invoked thereby, the different update tasks including a UI update task that updates the UI of the media device and a content update task that updates the content presented by the media device;
receiving from the personalization language model a first update task determined thereby based at least on the first natural language user input;
generating one or more first application programming interface (API) calls based on the first update task; and
placing the one or more first API calls to a service that is configured to implement the first update task based on the one or more first API calls.

2. The computer-implemented method of claim 1, wherein:
the first update task comprises the UI update task, and placing the one or more first API calls to the service that is configured to implement the first update task based on the one or more first API calls comprises placing the one or more first API calls to a service that is configured to implement the UI update task based on the one or more first API calls; or
the first update task comprises the content update task, and placing the one or more first API calls to the service that is configured to implement the first update task based on the one or more first API calls comprises placing the one or more first API calls to a service that is configured to implement the content update task based on the one or more first API calls.

3. The computer-implemented method of claim 1, wherein obtaining the first natural language user input comprises:
receiving a voice data representation of the first natural language user input;
converting the voice data representation of the first natural language user input into a text representation of the first natural language user input; and
transforming the text representation of the first natural language user input into a format suitable for processing by the personalization language model.

4. The computer-implemented method of claim 1, wherein obtaining the first natural language user input comprises:
receiving a text representation of the first natural language user input; and
transforming the text representation of the first natural language user input into a format suitable for processing by the personalization language model.

5. The computer-implemented method of claim 1, wherein receiving from the personalization language model the first update task determined thereby based at least on the first natural language user input comprises:
receiving from the personalization language model one of a real time update task or an offline update task.

6. The computer-implemented method of claim 1, wherein receiving from the personalization language model the first update task determined thereby based at least on the first natural language user input comprises:
receiving from the personalization language model a time-bound update task.

7. The computer-implemented method of claim 1, wherein receiving from the personalization language model the first update task determined thereby based at least on the first natural language user input comprises:
receiving from the personalization language model an update task determined thereby based on the first natural language user input and a particular UI context associated with the UI of the media device.

8. The computer-implemented method of claim 1, wherein receiving from the personalization language model the first update task determined thereby based at least on the first natural language user input comprises:
receiving from the personalization language model an update task having a particular scope.

9. The computer-implemented method of claim 8, wherein receiving from the personalization language model the update task having the particular scope comprises:
receiving from the personalization language model the UI update task having a particular scope of system, channel, page, row, content, navigation, summarization, transition, or metadata; or
receiving from the personalization language model the content update task having a particular scope of user interest, content removal, content filtering, context-aware processing, time-bound processing, item group processing, or custom complex queries.

10. A system for personalizing a user interface (UI) of a media device or content presented thereby, comprising:
one or more memories; and
at least one processor each coupled to at least one of the memories and configured to perform operations comprising:
obtaining a first natural language user input;
providing the first natural language user input to a personalization language model that is configured to interpret different natural language user inputs to respectively determine different update tasks invoked thereby, the different update tasks including a UI update task that updates the UI of the media device and a content update task that updates the content presented by the media device;
receiving from the personalization language model a first update task determined thereby based at least on the first natural language user input;
generating one or more first application programming interface (API) calls based on the first update task; and
placing the one or more first API calls to a service that is configured to implement the first update task based on the one or more first API calls.

11. The system of claim 10, wherein:
the first update task comprises the UI update task, and placing the one or more first API calls to the service that is configured to implement the first update task based on the one or more first API calls comprises placing the one or more first API calls to a service that is configured to implement the UI update task based on the one or more first API calls; or
the first update task comprises the content update task, and placing the one or more first API calls to the service that is configured to implement the first update task based on the one or more first API calls comprises placing the one or more first API calls to a service that is configured to implement the content update task based on the one or more first API calls.

12. The system of claim 10, wherein obtaining the first natural language user input comprises:
receiving a voice data representation of the first natural language user input;
converting the voice data representation of the first natural language user input into a text representation of the first natural language user input; and transforming the text representation of the first natural language user input into a format suitable for processing by the personalization language model.

13. The system of claim 10, wherein obtaining the first natural language user input comprises:
   receiving a text representation of the first natural language user input; and
   transforming the text representation of the first natural language user input into a format suitable for processing by the personalization language model.

14. The system of claim 10, wherein receiving from the personalization language model the first update task determined thereby based at least on the first natural language user input comprises:
   receiving from the personalization language model one of a real time update task or an offline update task.

15. The system of claim 10, wherein receiving from the personalization language model the first update task determined thereby based at least on the first natural language user input comprises:
   receiving from the personalization language model a time-bound update task.

16. The system of claim 10, wherein receiving from the personalization language model the first update task determined thereby based at least on the first natural language user input comprises:
   receiving from the personalization language model an update task determined thereby based on the first natural language user input and a particular UI context associated with the UI of the media device.

17. The system of claim 10, wherein receiving from the personalization language model the first update task determined thereby based at least on the first natural language user input comprises:
   receiving from the personalization language model an update task having a particular scope.

18. The system of claim 17, wherein receiving from the personalization language model the update task having the particular scope comprises:
   receiving from the personalization language model the UI update task having a particular scope of system, channel, page, row, content, navigation, summarization, transition, or metadata; or
   receiving from the personalization language model the content update task having a particular scope of user interest, content removal, content filtering, context-aware processing, time-bound processing, item group processing, or custom complex queries.

19. A non-transitory computer-readable medium having instructions stored thereon that, when executed by at least one computing device, cause the at least one computing device to perform operations for personalizing a user interface (UI) of a media device or content presented thereby, the operations comprising:
   obtaining a first natural language user input;
   providing the first natural language user input to a personalization language model that is configured to interpret different natural language user inputs to respectively determine different update tasks invoked thereby, the different update tasks including a UI update task that updates the UI of the media device and a content update task that updates the content presented by the media device;
   receiving from the personalization language model a first update task determined thereby based at least on the first natural language user input;
   generating one or more first application programming interface (API) calls based on the first update task; and
   placing the one or more first API calls to a service that is configured to implement the first update task based on the one or more first API calls.

20. The non-transitory computer-readable medium of claim 19, wherein:
   the first update task comprises the UI update task, and placing the one or more first API calls to the service that is configured to implement the first update task based on the one or more first API calls comprises placing the one or more first API calls to a service that is configured to implement the UI update task based on the one or more first API calls; or
   the first update task comprises the content update task, and placing the one or more first API calls to the service that is configured to implement the first update task based on the one or more first API calls comprises placing the one or more first API calls to a service that is configured to implement the content update task based on the one or more first API calls.

* * * * *